United States Patent [19]

Kobale et al.

[11] 4,150,877

[45] Apr. 24, 1979

[54] LIQUID CRYSTAL DISPLAY DEVICE

[75] Inventors: Manfred Kobale, Faistenhaar; Hans Krüeger, Munich; Hans-Peter Lorenz, Feldkirchen, all of Fed. Rep. of Germany

[73] Assignee: Siemens Aktiengesellschaft, Berlin & Munich, Fed. Rep. of Germany

[21] Appl. No.: 717,709

[22] Filed: Aug. 25, 1976

[30] Foreign Application Priority Data

Sep. 2, 1975 [DE] Fed. Rep. of Germany ....... 2539951
Sep. 2, 1975 [DE] Fed. Rep. of Germany ....... 2539024
Sep. 2, 1975 [DE] Fed. Rep. of Germany ....... 2539012

[51] Int. Cl.² .............................................. G02F 1/13
[52] U.S. Cl. ..................................... 350/341; 350/339
[58] Field of Search ................. 350/160 LC, 339, 341; 428/1

[56] References Cited

U.S. PATENT DOCUMENTS

| | | | |
|---|---|---|---|
| 3,876,287 | 4/1975 | Sprokel | 350/160 LC |
| 3,966,305 | 6/1976 | Young | 350/160 LC |
| 3,967,883 | 7/1976 | Meyerhofer | 350/160 LC |

Primary Examiner—Edward S. Bauer

Attorney, Agent, or Firm—Hill, Gross, Simpson, Van Santen, Steadman, Chiara & Simpson

[57] ABSTRACT

A liquid crystal display device having two carrier plates each having a first surface supporting electrically conducting electrode layers, the plates being hermetically sealed together with the first surfaces in facing relationship to form a chamber receiving a liquid crystal layer characterized by a covering layer disposed on each of the first surfaces. In the preferred embodiment, each of the first surfaces is provided with an obliquely vapor deposited aligning layer inbetween the conducting layer and the covering layer which covering layer has a thickness no greater than 0.05 microns and preferably less than 0.02 microns. The covering layer may be a silane derivative bonded by chemosorption on the aligning layer, a nitride such as silicon nitride, or an oxide. In producing the display device, a method which includes vapor depositing aligning layer on the first surface of each carrier plate subsequent to applying the electrical conducting electrode layers and prior to sealing the plates includes the improvement of applying the covering layer. The covering layer may be applied by sputtering-on process, by a pyrolytic process, by a resinate technique, by immersion of a material and by reacting with a material applied to the surface to be coated.

2 Claims, 1 Drawing Figure

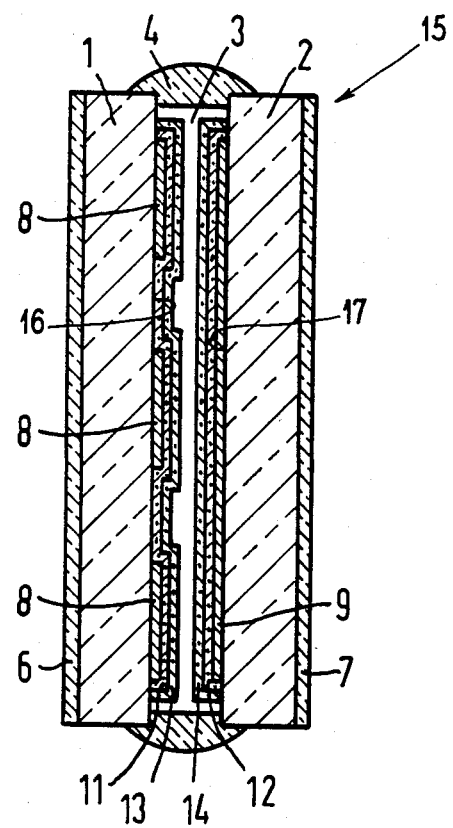

4,150,877

LIQUID CRYSTAL DISPLAY DEVICE

BACKGROUND OF THE INVENTION

1. Field of the Invention

The present invention is directed to a process of producing a liquid crystal display device and a device having a pair of carrier plates each having first surfaces supporting an electrical conducting electrode layer and an aligning layer which has been obliquely vapor deposited thereon. The pair of plates are hermetically sealed together with the first surfaces in facing relationship and extending plane parallel to each other to form a chamber which receives and encloses a layer of liquid crystal material.

2. Prior Art

Many different methods or techniques have been used for inducing a desired liquid crystal orientation in a liquid crystal cell device. Several examples of the techniques used are described in an article by Frederic J. Kahn, Gary N. Taylor and Harold Schonhorn, "Surface-Produced Alignment of Liquid Crystals", *Proceedings of the IEEE*, Vol. 61, No. 7, July 1973, pp. 823-828. Of these many techniques that are disclosed, an applied vapor depositing method is increasingly gaining significance for the following reasons. Depending of the selection of the layer material and the angle between the vapor depositing direction and the perpendicular or normal to the substrate surface, which angle is referred to as a vapor depositing or oblique vapor depositing angle, the oblique vapor depositing method can produce almost any desired preferential direction in a liquid crystal layer and, in addition, it can deliver both defined and reproducible values. In a liquid crystal cell with a twisted director, which cell operates as a rotational cell, an essential precondition for the liquid crystal cell is a uniformly plate-parallel liquid crystal orientation. In such a uniform liquid crystal orientation, the liquid crystal layer is aligned uniformly plate-parallel or uniformly "homogeneously" when its liquid crystal molecules not only lie in a plane which is parallel to the plate plane but also lie parallel to one another within the plane. The above-mentioned oblique vapor depositing process is in particular very successful in achieving the desired uniform plate-parallel liquid crystal orientation.

In these previously used methods of oblique vapor deposition, especially large oblique vapor deposition angles preferably 85° angles were selected to obtain a homogeneous liquid crystal orientation. A description of the method is disclosed in U.S. Pat. No. 3,834,792 and in an article by John L. Janning, "Thin Film Surface Orientation for Liquid Crystals", *Applied Physics Letter*, Vol. 21, No. 4, Aug. 15, 1972, pp. 173-174. Since more substrate can be simultaneously coated in an oblique vapor depositing operation with a more acute or smaller angle between the vapor depositing direction and the substrate plane, such acute angles, which are disclosed in the patent and the above-mentioned article by Janning, permit especially efficient manufacturing processes. Studies have shown, however, that a large oblique vapor depositing angle leads to relatively large angle between the director of the liquid crystal layer and the plane of the plate which large angle is an angle of incident. With such a large angle of incident, the multiplex behavior of the liquid crystal layer is generally impaired, for example the voltage contrast characteristic curve is less steep and the viewing angle region is also restricted especially with regard to rotational cells. For example, when viewing in the direction of the director of the liquid crystal layer, the contrast will disappear.

The above-mentioned optical inadequacies and switching difficulties can be removed or cleared up by lessening the oblique vapor depositing angle. For example, by transition from an oblique vapor depositing angle of 85° down to 60°, the angle of incident can be reduced from a value of greater than 20° to about 5° which is a very favorable value especially for rotational cells. This initially incomprehensible appearing correlation between oblique vapor depositing angle and angle of incident may be traceable back to the fact that the vapor depositing layers form cigar-shaped ellipsoids parallel to one another and the liquid crystal molecules group themselves to the ellipsoids in the energenically most favorable tangential plane. However, small oblique vapor depositing angles are to be sure burdened with an unjustifiable high production expense especially in mass production and in addition, have an unpleasant side-effect of lengthening the cut-off time for the liquid crystal layer.

With a suitable selection of the material of the aligning layer, the liquid crystal molecules can also be homeotropically oriented or perpendicularly aligned to the substrate surface with a large oblique vapor depositing angle. But in this case as well, the optimum angle of incident lying somewhat under 90° do not occur. In fact, the most favorable orientation in the majority of all applications are slightly tilted homogeneous or respectively, homeotropic with the exact magnitudes for the liquid crystal oblique positions depending primarily on the selected display principle. For example, dynamic dispersion, the DAP effect, bistability effect and the angle will additionally be different for different parameters such as visibility, multiplexability, or switching on or switching off speeds. Above and beyond the above factors in a rotational cell with a twisting crystal layer with the twist of exactly 90°, the angles of incidents of the front and back carrier plate should be different from one another so that one of the two possible directions of rotation is energenically preferred and thus, the orientation cannot be locally disturbed or disrupted. The angle of incidents to be determined for the individual case thus represents a compromise value which in general can however only be produced under oblique vapor depositing conditions which are unfavorable from a manufacturing or technical point of view.

SUMMARY OF THE INVENTION

The present invention is directed to a method of providing a liquid crystal display and a liquid crystal display whose obliquely vapor deposited layers can be applied as expediently as possible and in which the liquid crystal layer nevertheless has an optimum angle of incidents which is variable in sufficiently large limits. To accomplish this task, a liquid crystal display having a pair of carrier plates each having first surfaces, said plates being hermetically sealed together with the first surfaces facing each other and extending plane parallel to each other to form a chamber, each of said first surfaces having electrically conductive electrode layers and an aligning layer of an obliquely vapor deposited material, and a layer of liquid crystal material disposed in the chamber has the improvement comprising a covering layer disposed on each of the aligning layers.

The invention proceeds from a starting point of the observation that the proposed covering layer or film transfers the topological structure of the obliquely vapor deposited layer onto its own surface in such a way that this stratified structure acts, with respect to the angle of incidents, like a layer applied at a smaller obliquely vapor depositing angle. Since increasing thicknesses of the covering layer or film will cause the influence of the underlying oblique vapor deposited layer to become steadily weaker and thus the effective oblique vapor depositing angle to become steadily less, the stimulated oblique vapor depositing angle depends essentially on the selected film or layer thickness. The film thickness is customarily under 0.05 $\mu$m and preferably has a value of less than 0.02 $\mu$m. By selecting the desired thickness, a most favorable angle of incidents can be exactly obtained with a fine tuning without having to depart from the most favorable oblique vapor depositing geometry and without having to accept lesser switching speeds.

Above and beyond the above-mentioned features of the invention, the covering layer of the present invention offer additional very essential advantages. Previously used dielectric layers will enter into long term chemical reaction with a series of the commonly used liquid crystal substance and as a result gradually cause the liquid crystal material to loose their orientation powers. In some circumstances at raised storage or operating temperatures, the deterioration of the liquid crystal cell is very rapid. Thus, for example an insulating layer with a silicon oxide base, which is in contact with biphenyls, will cause the liquid crystal layer to loose its orienting effect within a month when operating at a temperature of about 80° C. This drop in quality will prevent all efforts to employ liquid crystal displays universally.

If a material, which is also chemically resistant under a more lengthy heat influence, is now selected for the covering layer or film, then the optimally adjusted preferred direction of the liquid crystal layer can also be kept simultaneously thermally long term stable. Compounds which are suitable for this purpose as the covering layer or film are nitrides, particularly silicon nitride and certain (organo-) silanes.

If the covering layer or film is formed of an electrically insulating material, the covering layer can also provide a third function. In this case, short circuits which would otherwise be caused by electrically conductive impurities at the surface of the liquid crystal layer are avoided and the display is thus more effectively protected against operating disruptions or even break downs or failures.

The covering layer or film of the present invention may be applied reactively, pyrolytically, as a resinant layer or by immersion. It may also be atomized on reactively or can be vapor deposited at an angle different from the oblique vapor depositing angle of the underlying layer. An especially simple technique consists in increasing the pressure at the end of the oblique vapor depositing operation high enough, for example from $10^{-5}$ to $5 \times 10^{-3}$ Torr and thus making the path length so small that the atoms or, respectively, molecules, arriving on or at the substrate no longer have a distinct preferential direction. For increasing the pressure it is logical in vapor depositing of nitrides to add nitrogen and when vapor depositing oxides to add oxygen.

BRIEF DESCRIPTION OF THE DRAWING

The FIGURE is a cross-sectional view of a liquid crystal display device in accordance with the present invention.

DESCRIPTION OF THE PREFERRED EMBODIMENT

The principles of the present invention are particularly useful in a liquid crystal display device generally indicated at 15 which is a rotational cell and will serve to display numerals when operated in transmission.

The display device 15 comprises a pair of plates 1 and 2 which have first surfaces 16 and 17, respectively. The plates 1 and 2 are arranged with their first surfaces 16 and 17 extending plane parallel and are joined together by a glass solder frame 4 to form a chamber 3 which receives a liquid crystal layer. The liquid crystal layer is usually inserted through a fill opening in the solder frame which opening is subsequently sealed to hermetically seal the layer in the chamber 3 from the surrounding environment.

Each of the plates 1 and 2 carries a polarizer 6 and 7, respectively, on an outer facing surface. To use the display as a rotational cell, the polarizers 6 and 7 are positioned to be crosspolarizers.

The first surfaces 16 and 17 are provided with transparent electrical conducting electrodes 8 and 9, respectively. One of the electrode coatings such as 8 is segmented in a known fashion.

In addition to carrying the electrode layers such as 8 and 9, the first surfaces 16 and 17 are provided with an intermediate aligning layer 11 and 12, respectively. The intermediate layers 11 and 12 have been obliquely vapor deposited in a known manner such as disclosed in the above-mentioned U.S. Pat. No. 3,834,792. Each of the intermediate layers 11 and 12 is provided with a covering layer or film 13 and 14, respectively, which has the thickness of approximately 0.01 $\mu$m.

The parts of the display 15 consist of the following materials. The carrier plates 1 and 2 are made of glass. The electrode coatings 8 and 9 are coatings of $SnO_2$. The obliquely vapor deposited layer can consist of a material selected from a group consisting of magnesium fluoride, aluminum oxide, zinc sulfide, silicon oxide and a hardened glass, for example a mixture of silicon oxide, aluminum oxide and calcium oxide. The covering layers 13 and 14 are $Si_3N_4$.

The silicon nitride covering layers 13 and 14 are chemically stable and are electrically insulating. If the obliquely vapor deposited angle for the intermediate layers of 11 and 12 is 85° to the normal of the first surfaces 16 and 17, the covering layers 13 and 14 will lead to an angle of incidents of less than 5°.

Since the two glass plates 1 and 2 are arranged with the oblique vapor depositing direction of the layers 11 and 12 extending at 90° with respect to each other, the liquid crystal layer director, which is slightly inclined vis-a-vis the plane of the plates 1 and 2, describes on its way from the one carrier plate such as 1 to the other plate 2 a rotation of 90°. The twisted liquid crystal will cause the direction of polarization of a polarized light to be rotated by 90°. When an electrical field is applied to portions of the liquid crystal layer, the molecules of the layer in these portions will be aligned to extend substantially perpendicular to the plates 1 and 2 and will not rotate the direction of polarization of the polarized light. If the polarizers 6 and 7 are crossed polarizers, the ight whose direction of polarization was not rotated will not be passed by the second polarizer. See the article by M. Schadt and W. Helfrich, "Voltage-Dependent Optical Activity of a Twisted Nematic Liquid Crystal", *Applied Physics Letters*, Vol. 18, N. 4, Feb. 15, 1971, pp. 127-128. If polarizers 6 and 7 are arranged with the direction of polarization being parallel, the light will only be passed in the areas of the liquid crystal layer which have been subjected to an electrical field to destroy the twisting of the direction of polarization.

The process for producing a liquid crystal display device comprises applying electrical conductive electrode layer 8 or 9 on each of the first surfaces such as 16 and 17 of the plates 1 and 2, the electrical conducting layer can be segmented as illustrated by the layer 8 into individual controllable segments. After applying the layer, each of the first surfaces 16 and 17 is provided with the intermediate aligning layers such as 11 or 12. For example, these layers may be vapor deposited by a method such as disclosed in the above-mentioned patent. After providing the intermediate layer, the plates 1 and 2 may be assembled into the cell by being soldered together by utilizing the glass solder frame 4 so that a chamber 3 for enclosing the liquid crystal layer is formed. Depending on the selected method, the covering layer or film such as 13 or 14 may be applied prior to assemblying the plates into the device 15 or after assembly.

For example, if the covering layer such as 13 or 14 are to be of either silicon dioxide, silicon dioxide doped with boron oxide, or aluminum oxide, a gas phase of a volatile inorganic or organic compound which contains silicon, boron oxide doped silicon, or aluminum are mixed with an inert gas. This mixture of the gas phase of the desired compound and the inert gas is then conveyed onto the substrate which is heated. The oxide layer is then formed by thermal decomposition of the compound and is known as a pyrolytic process.

Another example of the method is by using a metal organic compound, in particular a compound of a carboxylate base, which is diluted with solvents. The substrate is immersed in this solution or sprayed with it, preferably in the direction of the oblique vapor deposited layers such as 11 or 12 so that a thin resinate layer is formed on the substrate surface. After heating the substrate to about 500° C., the compound decomposes and the metal, usually a non-precious metal, remains as an oxide layer on the substrate. Such a technique is known as a resinate technique.

If the covering layer or film such as 13 and 14 are to consist of a silicon nitride, then the silicon nitride can be applied to the carrier plate by sputtering the covering layer onto the aligning layer by ion bombardment of a cathode formed of a material of the layer such as silicon nitride or silicon and the sputtering is done in a nitrogen atmosphere. If a silicon target is selected, the nitrogen forms the desired nitrides by chemical reaction on the substrate and the sputtered-on layers will show no preferential directions.

If the covering layers or film are to be vapor deposited, the direction of movement of the vapor should be either perpendicular to the layer surface or at a large angle therewith which angle particularly should be greater than 60° to the substrate surface. By mounting the substrate on a planetary drive device, the substrate can be rotated as the vapor depositing occurs to vary the angle of the depositing.

In addition, vapor depositing can be accomplished by increasing the pressure after depositing the aligning layers. For example, if the intermediate layers such as 11 and 12 are of $Si_3N_4$, the covering layers 13 and 14 can also be of the same material. To accomplish this, the silicon nitride intermediate layer are formed by an oblique vapor depositing process such as disclosed in the above-mentioned patent. Toward the end of the oblique vapor depositing operation, the covering layers are formed by increasing the pressure from approximately $10^{-5}$ Torr to $5 \times 10^{-3}$ Torr so that the middle, free path length is greatly diminished and thus the particles no longer deposit themselves in a distinct preferential direction on the substrate. With an oblique vapor depositing angle of about 85°, the above change in pressure will cause the covering layer to be leveled out again in such a way that an angle of incidents of also about 5° will result. An obliquely vapor deposited nitride layer can be applied by either vapor depositing of silicon nitride or pure silicon in an extremely pure nitrogen atmosphere. In this process of vapor depositing, special care must be taken so that the atmosphere contains no impurities whatsoever, and in particular, no oxygen.

While the above-mentioned example of a process utilize silicon nitride as the intermediate layer 11 and 12, the materials of the intermediate layer may be selected from a group consisting of $MgF_2$, $Al_2O_3$, ZnS, SiO and hardened glass. In such instances, the covering layer is subsequently sputtered onto the vapor deposited intermediate layer.

To apply the vapor deposited layers utilizing silane, silanes such as Z-6040 or 470 A of Dow Corning along with a silane adhesion-promoter GF91 of the Wacker Company are especially suitable. Z-6040 and 470 A of Dow Corning have the following structural formulas:

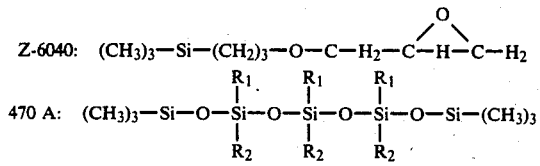

wherein $R_1 = CH_3$, $R_2 = O-(CH_2)_8CH_3$.

The following three examples are especially simple and effective silanization of obliquely deposited layer to produce the covering layer.

EXAMPLE I

A completely assembled but yet unclosed and unfilled liquid crystal display is rinsed with a dilute silane solution. The silane concentration should not be greater than 5% and a solution of 0.1% to 1% solution silane Z-6040 of the Dow Corning Company in acetone is especially suitable. However, silane 470 A or GF91 can also yield good results. Once the rinsing has been completed, the silanized surface is dried at raised temperatures. An especially stable, homogeneous orientation is obtained. In these examples, the obliquely vapor deposited layer can comprise magnesium fluoride, aluminum oxide, zinc sulfide, silicon oxide or a glass with calcium oxide, aluminum oxide, and silicon oxide. In addition, other materials for the intermediate layer may be suitable.

Example II

A completely assembled liquid crystal display device which is unsealed and unfilled is put into a vacuum tank in which a small amount of silane is present. The tank is then evacuated and heated to a point so that a suitably high silane vapor pressure comes about. This silane vapor will penetrate into the chamber 3 and is there absorbed on the obliquely vapor deposited layers. By regulating the vapor pressure by controlling the temperature, as well as the reaction time, the thickness of the coating or covering can be selected and set in a reproducible precise manner. In this case, a free selection exists for the intermediate layer materials. This process is preferred over the process of Example I in those cases where the liquid crystal cell has been closed except for the filling opening because the process of rinsing of the first example is more involved.

Example III

A liquid crystal display device is rinsed out as in Example I, however, is subjected to a substantially higher temperature. For example, 500° C. so that the silane will burn and decompose. In this process, the silane includes decomposition products of silicon nitride which is an extraodinarily resistant compound. In particular, silane with an amino-function group are suitable, for example the silane Z-6040 of Dow Corning Company with the structural formula of $(CH_3O)_3$—Si—$(CH_2)_3$—NH—$CH_2$—$CH_2$—$NH_2$. If the liquid crystal display is to receive a solder glass seal or closure, then the following procedure is recommended. Each of the carrier plates is first dipped in the silane solution and only then has the solder frame melted to join the plates together. With the normal necessary melting temperatures, the dipping solution is then also simultaneously burned to decompose to produce the desired coating products. In this way, a single heating will be sufficient for both forming the glass solder frame seal and applying the cover layer or film. If a glass solder with a special low melting point is selected, then pyrolysis can be avoided.

While the specific embodiments of the invention have been described for film on an obliquely vapor deposited intermediate layer, the provision of the covering layer is not limited to these specific embodiments. The covering layer may be used in a cell having a preferential direction other than a uniformly tilted homogeneous orientation and, for example, a cell having a homeotropic orientation. If a cell only requires a long term heat resistant orientation or minimizing the danger of short circuits, the covering layer of the present invention can be utilized.

Although minor modifications may be suggested by those versed in the art, it should be understood that we wish to employ within the scope of the patent warranted hereon, all such modifications as reasonably and properly come within the scope of our contribution to the art.

We claim:

1. In a liquid crystal display device having a pair of carrier plates each having a first surface, said plates being hermetically sealed together with the first surfaces facing each other and extending plane parallel to each other to form a chamber each of said first surfaces having an electrically conducting electrode layer and an aligning layer of an obliquely vapor deposited material, and a layer of liquid crystal material disposed in said chamber, the improvement comprising a covering layer disposed on each of said aligning layers, each of the covering layers being a silane derivative which is bound to the aligning layer by chemosorption.

2. In a liquid crystal display having a pair of carrier plates each having a first surface supporting an electrically conducting electrode layer and an aligning layer of obliquely deposited material, said plates being hermetically sealed together with the first surfaces in facing relationship and extending plane parallel to each other to form a chamber, and a layer of liquid crystal material disposed in the chamber, the improvement comprising a covering layer disposed on each of said aligning layers, said covering layer being an insulating layer, having a thickness of approximately 0.01 $\mu$m and being a silane derivative.

* * * * *